(No Model.)  2 Sheets—Sheet 1.
R. C. KOERBER.
NUT CRACKING MACHINE.
No. 353,143.  Patented Nov. 23, 1886.
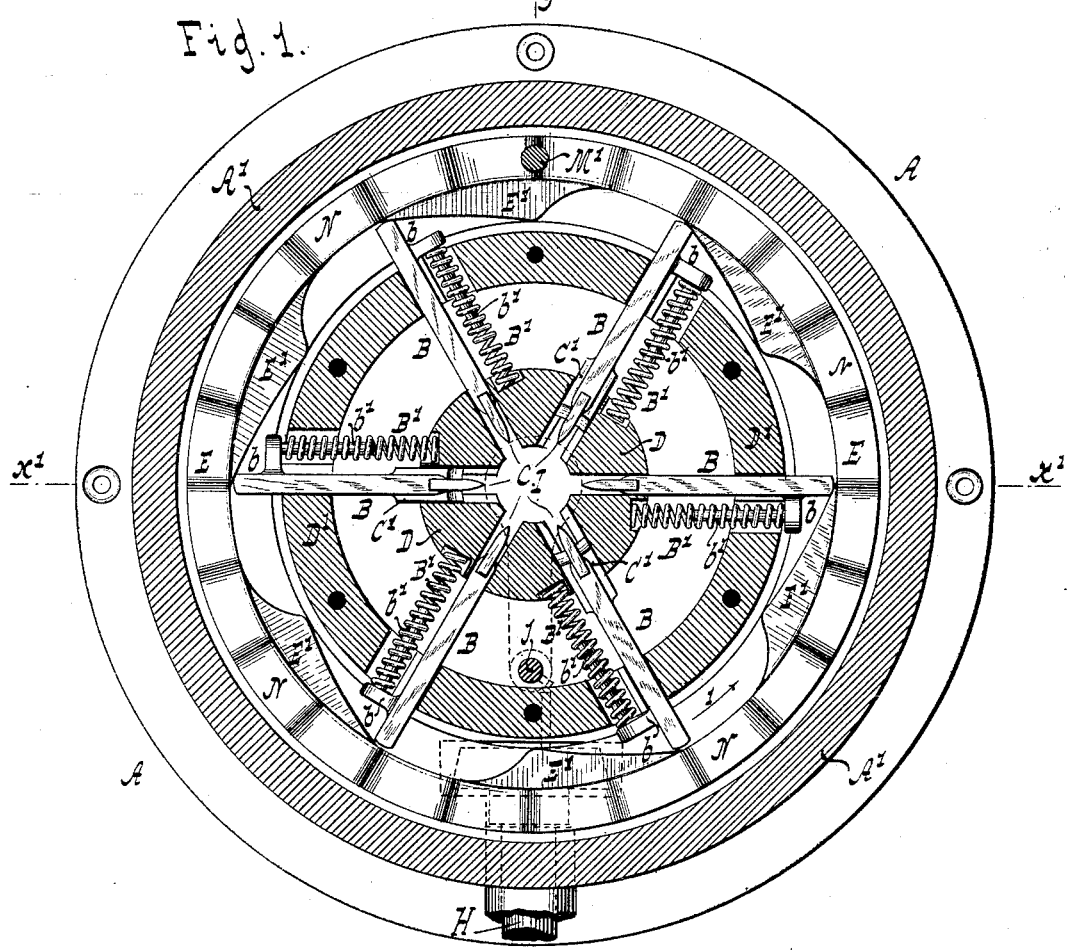
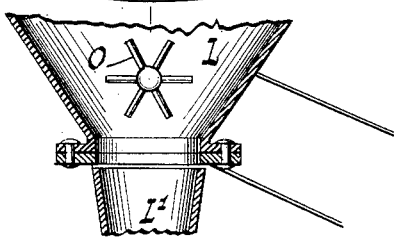
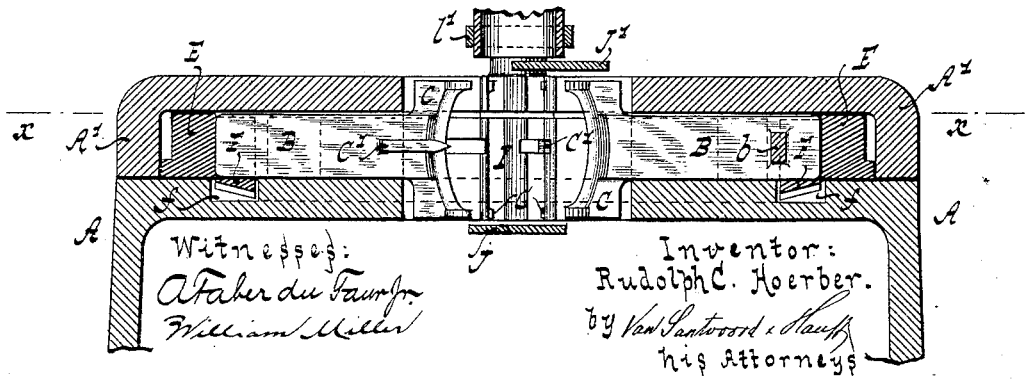
Witnesses: A. Faber du Faur Jr.  
William Miller
Inventor: Rudolph C. Koerber.  
by Van Santvoord & Hauff  
his Attorneys

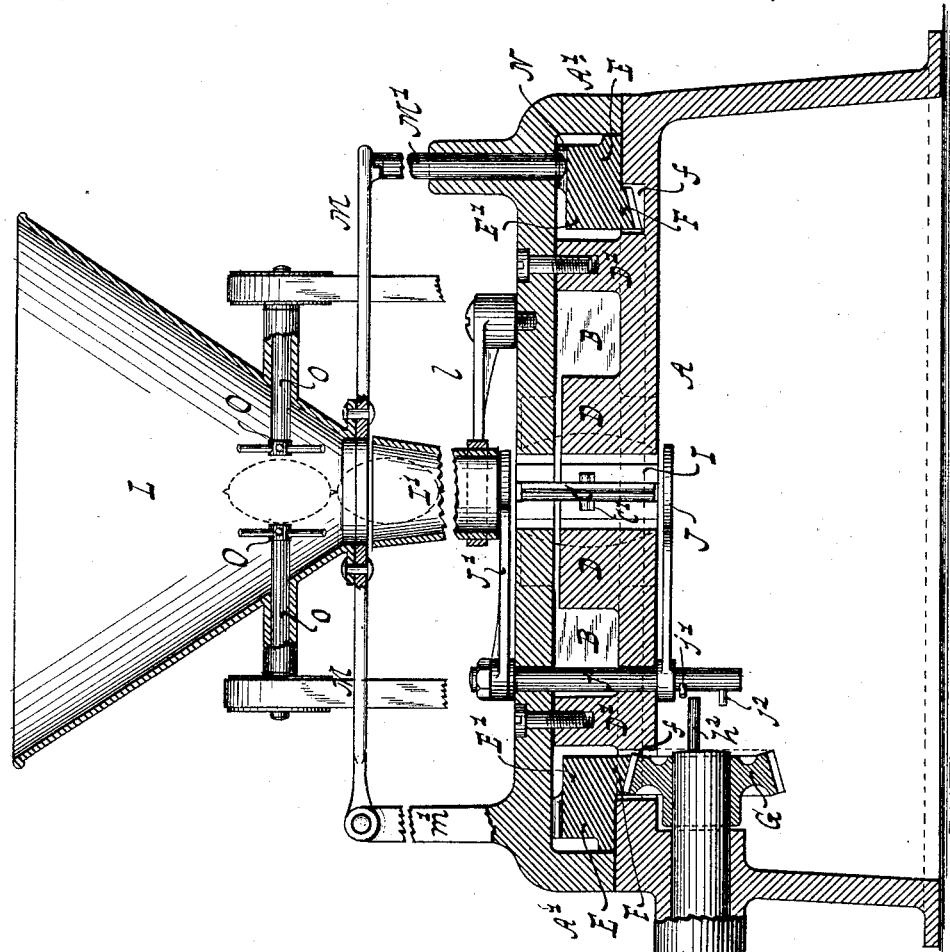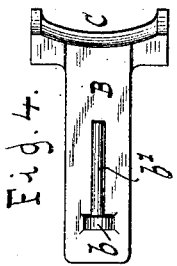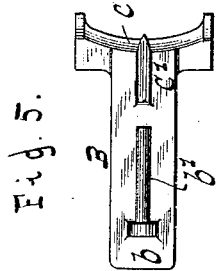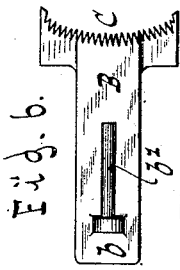

UNITED STATES PATENT OFFICE.

RUDOLPH C. KOERBER, OF AUSTIN, TEXAS.

NUT-CRACKING MACHINE.

SPECIFICATION forming part of Letters Patent No. 353,143, dated November 23, 1886.

Application filed May 13, 1886. Serial No. 202,077. (No model.)

*To all whom it may concern:*

Be it known that I, RUDOLPH C. KOERBER, a citizen of the United States, residing at Austin, in the county of Travis and State of Texas, have invented new and useful Improvements in Nut-Cracking Machines, of which the following is a specification.

This invention has for its object to provide a novel machine for rapidly cracking nuts, to split the shells thereof from end to end, and also transversely, if desired.

The object of my invention is accomplished by the construction and combination of devices hereinafter described and claimed, reference being made to the accompanying drawings, in which—

Figure 1 represents a horizontal section in the plane $x$ $x$, Fig. 2, of a nut-cracking machine embodying my invention. Fig. 2 is a vertical section of the same in the plane $x'$ $x'$, Fig. 1. Fig. 3 is a similar section in the plane $y$ $y$, Fig. 1. Figs. 4 and 5 are side elevations of the piercers and piercer-carriers detached. Fig. 6 is a similar view of a modification of such piercers.

Similar letters indicate corresponding parts.

In the drawings, the letters A A' designate, respectively, the body and cover of a casing which contains the working parts of the machine and supports the driving and feeding attachments. In this casing are arranged a radial series of carriers, B, to which are secured the shell-piercers C, and said carriers are guided at one end in suitable ways formed in a hub, D, while at their other ends they are guided in ways formed in a concentric guide-ring, D', so that the carriers can move only in the direction of their lengths.

The shell-piercers C in this example are formed integral with the carriers, and as shown in the drawings, Figs. 1, 2, 4, and 5, have a cutting contour corresponding to the shape of the nut, so that they will penetrate the shell lengthwise from one end to the other. To sever the shell transversely, each alternate carrier is provided with additional shell-piercers, C', that are placed at right angles to the piercers C, and centrally between the ends thereof, so as to penetrate the shell of the nut approximately at its greatest diameter.

To impart a motion to all of the radial piercer-carriers in a direction toward their common center, I make use of a cam-ring, E, which carries a number of cams, E', (one for each piercer-carrier,) that engage with the ends of the piercer-carriers when said ring is rotated. A rotary motion can be imparted to this cam-ring in any suitable manner; but as shown in the drawings I provide the same with a pendent circular rack, F, which is received in a circular recess, $f$, in the body of the casing, and is engaged by a bevel-gear, G, that is mounted upon a shaft, H, having bearings in the casing. A pulley, $h$, upon this shaft can be connected to a pulley on a counter-shaft by a belt when the machine is to be operated by power, and a post, $h'$, on the end of the shaft affording hold for a crank gives means to operate the machine by hand.

As the cam-ring moves in the direction of arrow 1, Fig. 1, the piercer-carriers B are alternately engaged by the cams and then released, after which release they are returned to their normal position, Fig. 1, by springs B', that are confined between the hub D and lugs $b$, extending from said carriers. To prevent the springs from becoming disengaged, one end of each enters a recess in the hub D, while a post, $b'$, extending from each of the lugs, enters the other end of each spring.

The nut to be cracked is placed in a central chamber, I, extending entirely through the hub D, and into which the shell-piercers protrude when forced inward by the cams, and said chamber is closed at its discharging end by a movable door, J, which is secured to an arbor, $j$, having bearings in the casing. To automatically open and close this door by the rotation of the shaft, so as to discharge the cracked nut, I provide the arbor $j$ with two pins or projections, $j'$ $j^2$, which are engaged by a post, $h^2$, extending from the end of the shaft H. The post $h^2$ engages the pin $j'$ to close the door and the pin $j^2$ to open the door, so that with each rotation of the shaft the door is opened and closed once. The gears on the cam-ring and shaft are so proportioned that one rotation of the shaft will cause the cam-ring to revolve through the length of one cam. Consequently the door is opened as each nut is cracked.

To automatically feed the nuts to the receiving-chamber I, a conical hopper, L, is used, and in line therewith is placed a feed-tube, L', which is supported in line with the receiving-chamber by a ring, l', carried by an arm, l, attached to the casing, so that the nuts must necessarily enter the receiving-chamber lengthwise. A door, J', is arranged above the receiving end of the receiving-chamber and below the feed-tube L', which by its connection with the arbor j is vibrated to close or open the end of the guide-tube to prevent and allow the exit of nuts from the guide-tube. As shown in the drawings, Fig. 2, the door J' is only half-closed when the door J is fully closed, and when the door J opens the door J' will also open, so that as the cracked nut is discharged the ingress of a nut into the chamber is allowed; but before the entering nut can make its exit from the discharging end of the chamber the door J is again closed.

To promptly feed the nuts in the hopper L to the feed-tube L', a shaking motion is imparted to the former. This may be accomplished by connecting the hopper by suitable means to one of the moving parts of the machine, and in the example shown in the drawings I have supported the hopper on an arm, M, which is pivoted at m to a post, m', on the casing. This arm extends beyond the hopper and its free end rests upon a trip-pin, M', which has bearings in a hub cast on the casing. The lower end of this trip-pin extends into the interior of the casing and is in contact with a corrugated face, N, on the cam-wheel, so that as the pin alternately enters the depressions and is engaged by the crests it falls and rises, thereby imparting a vibratory or shaking motion to the hopper.

The general form of the shell-piercer C, as shown in Figs. 4 and 5, must be varied to adapt the same to the different species of nuts, the piercers shown in the drawings being especially adapted for pecan nuts. In Fig. 6 the piercer is shown to consist of a number of serrations which enter the shell.

In the example shown in the drawings six piercer-carriers are shown, but this number may be reduced to three, or even two, but in such cases the piercers must be made wider and have several blades; or the carrier can be provided with a jaw consisting of a block of metal having a concavity to correspond to the convexity of the nut, and such jaw is provided with a large number of points or blades which are distributed in the concavity.

In the example shown in the drawings the feed-tube L' is made of such a length as to contain about twenty or more nuts, and the hopper L is provided with a pair of agitators, O O, each of which consists of a hub, from which extend several arms. The agitators are mounted upon shafts o o, having bearings in the material of the hopper, and the shafts are slowly rotated by a belt and pulley connected with a counter-shaft. (Not shown in the drawings.) The agitators, as shown in Fig. 3, are arranged at such a distance apart that the nuts can pass between the same and into the feed-tube only in the direction of their longer diameter. The proper guidance of the nuts is thus greatly facilitated.

What I claim as new, and desire to secure by Letters Patent, is—

1. The combination, in a machine for cracking nuts, having a chamber, I, for the passage therethrough of the nut to be cracked, of a series of radially-movable carriers, B, having attached nut-shell piercers C, provided with cutting-edges, and means for operating the carriers to cause the cutting-edges of the piercers to simultaneously enter the chamber and penetrate and split the nut-shell, substantially as described.

2. The combination, in a machine for cracking nuts, of a hub, D, having a chamber, I, for the passage of the nut therethrough, radially-movable carriers B, having attached shell-piercers C, provided with curved cutting-edges, and means for operating the carriers to cause the piercers to enter the nut-receiving chamber and penetrate the nut-shell lengthwise from end to end, substantially as described.

3. The combination, in a machine for cracking nuts, of a hub having a chamber for the passage of the nut therethrough, a vibrating door for opening and closing the discharge end of the chamber, a series of radially-movable carriers having shell-piercers, and means for operating the carriers to cause the piercers to enter into the nut-chamber and penetrate the nut-shell, substantially as described.

4. The combination, with the shell-piercers and the spring-pressed piercer-carriers, of guides for the same, a rotary cam-ring engaging the carriers, a central receiving-chamber, and a vibrating door closing the same, substantially as shown and described.

5. The combination, with the shell-piercers and the spring-pressed piercer-carriers, of guides for the same, a rotary cam-ring engaging the carriers, a central receiving-chamber, vibrating doors at the receiving and discharging ends of the same, and a hopper communicating with the chamber, substantially as shown and described.

6. The combination, with the shell-piercers C and the spring-pressed piercer-carriers B, of guides for the piercer-carriers, a rotary ring, E, provided with cams E', engaging the carriers, and a rack, F, an arbor, j, carrying pins j' j², engaged by a post on the gear G, doors J J', attached thereto, extending over the receiving and discharging ends of the chamber, the hopper L, and feed-tube L', substantially as shown and described.

7. The combination, with the rotary ring E and the corrugations N thereon, of the hopper L, the arm M, supporting the same, and the trip-pin M', in contact with the arm and corrugations on the rotary ring, substantially as shown and described.

8. The combination, with the rotary ring E, the corrugations N thereon, of the hopper L, the trip-pin M', in contact with the hopper and the corrugations on the ring, and the feed-tube L', substantially as shown and described.

9. The combination, with the shell-piercers, of carriers for the same, mechanism, such as described, for actuating the carriers, a receiving-chamber, and a vibratory hopper, substantially as set forth.

10. The combination, with the shell-piercers, of carriers for the same, mechanism, such as described, for actuating the carriers, a receiving-chamber, a vibratory hopper, L, and a feed-tube, L', substantially as shown and described.

11. The combination, with a carrier, B, of longitudinal shell-piercers C and transverse shell-piercers C', substantially as shown and described.

12. The combination, with carriers B, of longitudinal concave shell-piercers C and transverse concave shell-piercers C', substantially as set forth.

13. The combination, with the shell-piercers, of carriers for the same, mechanism, such as described, for actuating the carriers, a receiving-chamber, a hopper, a feed-tube communicating therewith, and the agitators O O in the hopper, substantially as described.

In testimony whereof I have hereunto set my hand and seal in the presence of two subscribing witnesses.

RUDOLPH C. KOERBER. [L. S.]

Witnesses:
W. HAUFF,
E. F. KASTENHUBER.